(12) United States Patent
Wentink

(10) Patent No.: US 9,877,281 B2
(45) Date of Patent: Jan. 23, 2018

(54) SCHEDULED PEER POWER SAVE MODE

(71) Applicant: Maarten Menzo Wentink, Naarden (NL)

(72) Inventor: Maarten Menzo Wentink, Naarden (NL)

( * ) Notice: Subject to any disclaimer, the term of this patent is extended or adjusted under 35 U.S.C. 154(b) by 0 days.

(21) Appl. No.: 14/449,399

(22) Filed: Aug. 1, 2014

(65) Prior Publication Data

US 2014/0341102 A1 Nov. 20, 2014

Related U.S. Application Data

(63) Continuation of application No. 12/363,740, filed on Jan. 31, 2009, now Pat. No. 8,797,930.

(60) Provisional application No. 61/025,417, filed on Feb. 1, 2008, provisional application No. 61/025,415, filed on Feb. 1, 2008.

(51) Int. Cl.
*H04W 52/02* (2009.01)
*H04W 28/02* (2009.01)

(52) U.S. Cl.
CPC ... *H04W 52/0225* (2013.01); *H04W 28/0289* (2013.01); *H04W 52/0206* (2013.01); *H04W 52/0216* (2013.01); *H04W 52/0219* (2013.01); *H04W 52/0235* (2013.01); *Y02B 60/50* (2013.01)

(58) Field of Classification Search
CPC . H04W 36/02; H04W 36/04; H04W 52/0225; H04W 52/0235; H04W 52/0216; H04W 52/0219; H04W 52/0206; H04W 28/0289; Y02B 60/50
See application file for complete search history.

(56) References Cited

U.S. PATENT DOCUMENTS

| | | | |
|---|---|---|---|
| 2004/0125777 A1* | 7/2004 | Doyle et al. | 370/338 |
| 2005/0025167 A1* | 2/2005 | Ishibashi et al. | 370/412 |
| 2005/0122927 A1* | 6/2005 | Wentink | 370/311 |
| 2005/0135284 A1* | 6/2005 | Nanda et al. | 370/294 |
| 2006/0285517 A1 | 12/2006 | Kakani | |
| 2008/0186901 A1* | 8/2008 | Itagaki et al. | 370/315 |
| 2009/0196211 A1 | 8/2009 | Wentink | |

* cited by examiner

*Primary Examiner* — Jianye Wu
(74) *Attorney, Agent, or Firm* — McClure, Qualey & Rodack, LLP

(57) ABSTRACT

Embodiments of scheduled peer power save systems, devices, and methods are disclosed. For example, methods of saving power for stations configured to communicate via a direct link are provided. Embodiments of scheduled peer power save systems, devices and methods are disclosed. For example, methods of saving power for stations configured to communicate via a direct link are provided. In one embodiment, among others, a method comprises waking up, at a station and peer station, before a scheduled wakeup interval. The scheduled wakeup interval is defined relative to common timing reference at the station and the peer station. Further, in the absence of a service period between the station and the peer station, the station and the peer station stay awake until at least a predefined time period has elapsed or a predefined number of idle slots have elapsed.

6 Claims, 14 Drawing Sheets

SCHEDULED PEER POWER SAVE MODE

CROSS-REFERENCE TO RELATED APPLICATIONS

This application is a continuation of application Ser. No. 12/363,740, filed Jan. 31, 2009, which claims priority to U.S. Provisional Application having Ser. No. 61/025,417, filed on Feb. 1, 2008, and U.S. Provisional Application having Ser. No. 61/025,415, also filed on Feb. 1, 2008, all of the above which is also incorporated herein by reference in their entirety.

TECHNICAL FIELD

The present disclosure is generally related to communication systems, and, more particularly, is related to wireless communication systems and methods.

BACKGROUND

Wireless communication systems are widely deployed to provide various types of wireless communication, such as voice, data, and so on, between various devices (also referred to as stations) such as cell phones, laptop computers, cameras, servers, desktop computers, etc. IEEE 802.11 is a set of standards for wireless local area network (WLAN) communication between the devices, which is also sometimes referred to as wireless fidelity (WiFi). The devices fall into one of two categories: access points (APs) and clients. APs, normally routers, are base stations for the wireless network that connect to a wired network infrastructure. Clients are typically end devices, which are referred to as stations.

Wireless communication has provided users with the ability to communicate with wireless devices without the constraints of a wired connection. To further facilitate mobility, many wireless devices, such as cell phones, laptop computers, cameras, etc., also utilize mobile power sources, such as batteries. As many of these wireless devices utilize battery power, conserving power to extend battery life has emerged as a priority.

SUMMARY

Embodiments of scheduled peer power save systems, devices and methods are disclosed. For example, methods of saving power for stations configured to communicate via a direct link are provided. In one embodiment, among others, a method comprises waking up, at a station and peer station, before a scheduled wakeup interval. The scheduled wakeup interval is defined relative to a common timing reference at the station and the peer station. Further, in the absence of a service period between the station and the peer station, the station and the peer station stay awake until at least a predefined time period has elapsed or a predefined number of idle slots have elapsed.

Other systems, methods, features, and advantages of the present disclosure will be or become apparent to one with skill in the art upon examination of the following drawings and detailed description. It is intended that all such additional systems, methods, features, and advantages be included within this description, and be within the scope of the present disclosure.

BRIEF DESCRIPTION OF THE DRAWINGS

Many aspects of the disclosed systems and methods can be better understood with reference to the following drawings. The components in the drawings are not necessarily to scale, emphasis instead being placed upon clearly illustrating the principles of the disclosed systems and methods. Moreover, in the drawings, reference numerals designate corresponding parts throughout the several views.

DETAILED DESCRIPTION

Disclosed herein are various embodiments of scheduled peer power save mode (PSM) systems and methods wherein the battery life of a wireless device can be improved for at least the reason that the wake time is reduced when compared to conventional techniques. In scheduled peer PSM, a station and a peer station are configured to communicate over a direct link. The station and the peer station wake up according to a periodic schedule to see if the other station has traffic for it, and possibly to transmit traffic to the other station. During the scheduled peer listen intervals (also referred to as wakeup intervals), the station and the peer station can start service periods in which traffic is sent between the stations depending on whether they have traffic to send (e.g. transmit) to each other. The service periods may be Unscheduled Asynchronous Power Save Delivery (U-APSD) service periods, which are also referred to as unscheduled service periods. Other types of service periods may also be used. Also, depending on the amount of traffic they have to send, the stations can adjust the wakeup schedule and/or the duration of the service period. For the same traffic stream, the service periods will contain more frame exchanges when the time between wakeup intervals increases (e.g., the content of the service intervals typically increases when the time between the wakeup intervals increases). Hence, in scheduled peer PSM, a station may be able to transmit buffered traffic to a peer station instead of relying on the access point (AP) to perform this function. Further, in scheduled peer PSM, both stations may be able to be in a power save mode at the same time.

Such scheduled peer PSM systems, devices, and methods are described below in the context of IEEE 802.11 compliant communication systems, though the principles described herein can be extended to other communication systems and protocols and hence are not so limited. This description is written with reference to public documents IEEE Draft P802.11z_D0.1.doc, IEEE document IEEE802.11-2007.pdf (IEEE Std 802.11™-2007) and WFA document WMM_Specification_1_1.doc (WMM™ (including WMM™ Power Save) Specification version 1.1), which are all hereby incorporated by reference in their entirety.

Figure 1:
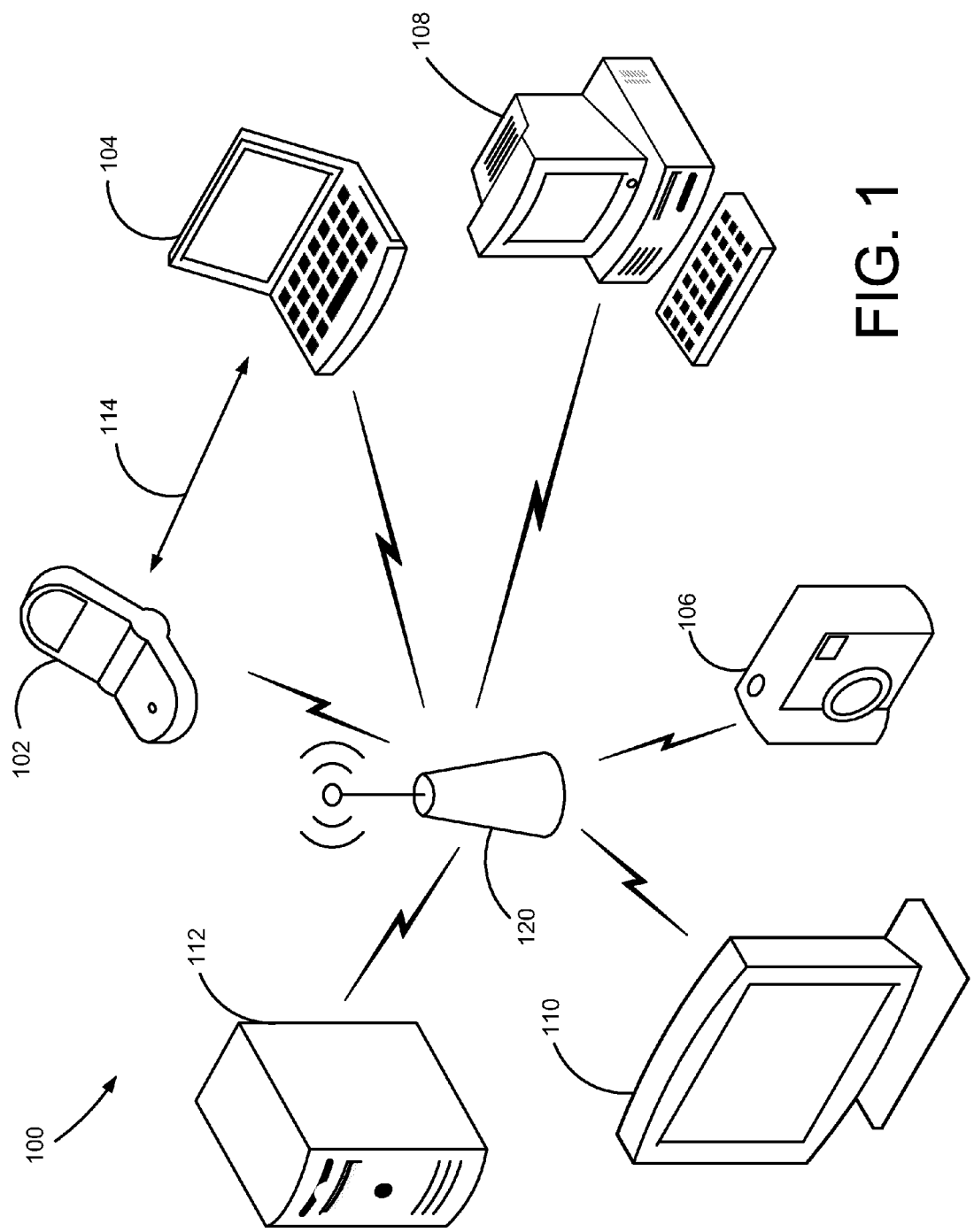
FIG. 1 is a block diagram of an exemplary communication environment in which embodiments of scheduled peer power save mode systems and methods can be implemented.

FIG. 1 is a block diagram of an exemplary communication environment 100 in which embodiments of scheduled peer PSM can be implemented. The communication environment 100 comprises a plurality of wireless and wired devices, one or more of which may be configured to operate as a wireless and wired device. One or more of the devices shown in FIG. 1 may incorporate scheduled peer PSM systems and methods, as described further below. Exemplary wireless devices include a cell phone 102, a laptop computer 104 (which, along with other devices, may communicate with the cell phone 102 in a direct link mechanism as represented by direct link 114), and a digital camera 106. The wired devices (e.g., with wireless capability) include a personal computer (PC) 108, a television 110, and a server 112. In the communication environment 100 shown in FIG. 1, the cell phone 102 is in communication (e.g., radio frequency communication) with the laptop computer 104 and the PC 108 via an AP 120, and the server 112 is in communication with the television 110 via the AP 120. Also, the digital camera 106 is in communication with the laptop 104 and the PC 108 via the AP 120. For instance, such communications may be used to load pictures from the digital camera 106 to the PC 108. For illustrative purposes, the cell phone 102 is shown as an appliance that embodies an embodiment of the scheduled peer PSM device 200 as a station, and the laptop 104 is shown as an appliance that embodies an embodiment of the scheduled peer PSM device 200 as peer station. Wireless direct links 114 may be instantiated between any of the devices shown in FIG. 1.

Note that communication between the various devices may employ one or more of a plurality of protocols, including 802.11 (e.g., 802.11a, 802.11b, 802.11e, 802.11g, 802.11n, 802.11z), WiMax, Ultra-Wide Band (UWB), Bluetooth, among other technologies. Additionally, although the communication environment 100 is shown as a basic service set (BSS) configuration, in some embodiments, communication among one or more devices may be implemented using peer-to-peer (also known as adhoc in many wireless technologies) communication in lieu of or in addition to communication through the AP 120. In FIG. 1, the cell phone 102 and laptop computer 104 can communicate peer-to-peer over the direct link 114.

Figure 2:
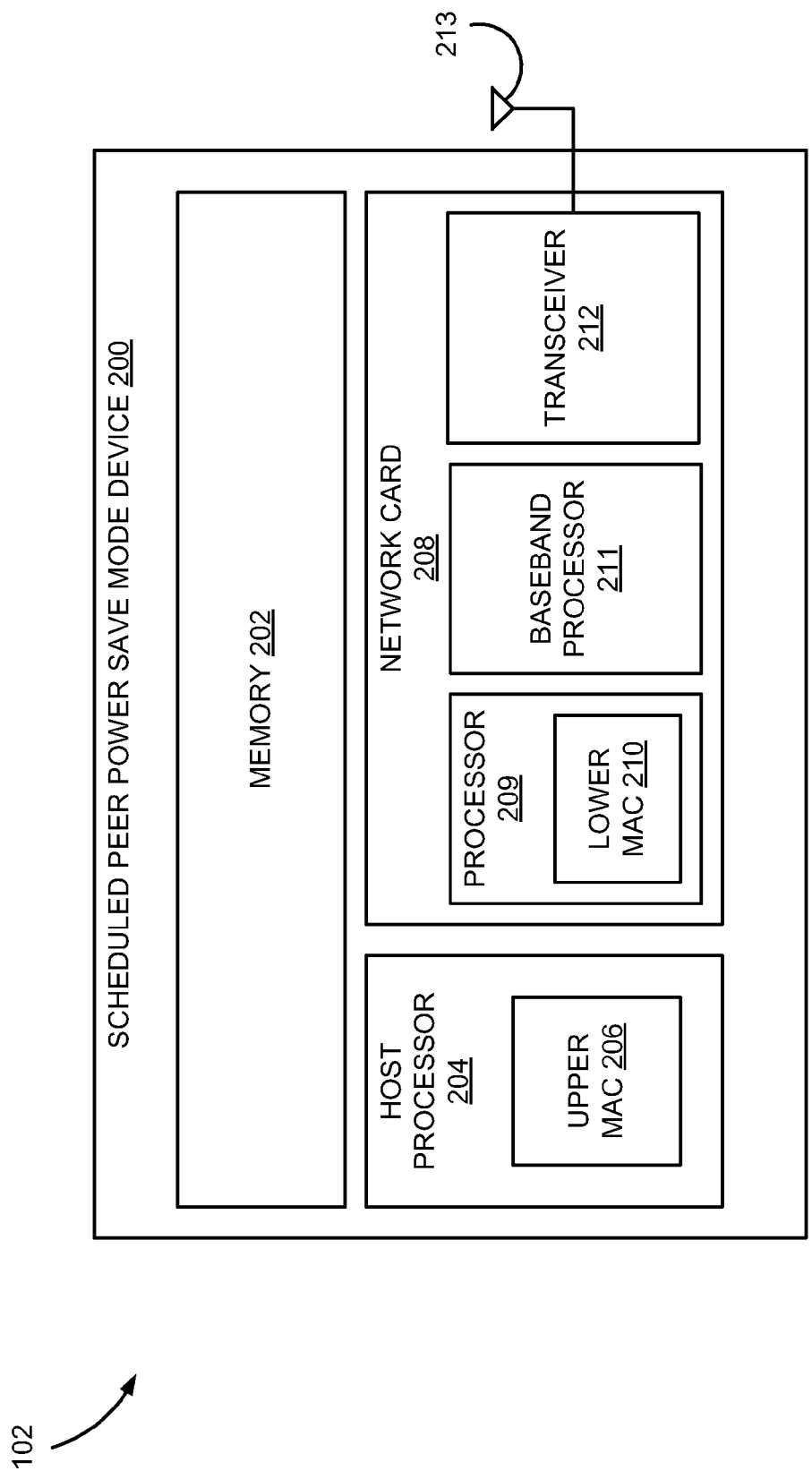
FIG. 2 is a block diagram that illustrates an embodiment of a scheduled peer power save mode (PSM) system embodied in one of the devices shown in FIG. 1.

FIG. 2 is a block diagram that illustrates an embodiment of a scheduled peer PSM device 200 implemented in the cell phone 102 shown in FIG. 1, with the understanding that other devices may embody the scheduled peer PSM device 200 in addition to, or in lieu of, the cell phone 102. Note that the devices shown in FIGS. 1 and 2 are exemplary in nature, and that the scheduled peer PSM device 200 may be implemented in any one of a plurality of different devices or appliances, including computers (desktop, portable, laptop, etc.), consumer electronic devices (e.g., multi-media players, music players, portable sound recording devices, digital radio devices), cell phones, smart phones, compatible telecommunication devices, personal digital assistants (PDAs), global positioning system (GPS) navigation systems, or any other type of network devices, such as printers, fax machines, scanners, hubs, switches, routers, set-top boxes, video game consoles, receivers, webcams, digital cameras, digital camcorders, televisions with communication capability, projectors, video servers, network attached storage (NAS) drives, roadside communication systems, cars, robots, etc. Scheduled peer PSM may be applied inside a house, a living room, an office, on a street, in a yard, a car, between a car and a roadside system, or in any one of a variety of other environments.

The scheduled peer PSM device 200 can be implemented using digital circuitry, analog circuitry, or a combination of both, and is embodied in one embodiment using a combination of hardware and software. As to hardware, one or more components of the scheduled peer PSM device 200 can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

In one embodiment, the scheduled peer PSM device 200 comprises a memory 202, a host processor (or media access controller in some embodiments) 204 executing code (e.g., a driver) referred to also as an upper MAC 206, and a network card 208 (e.g., network interface card or wireless card) coupled to the host processor 204, the network card 208 comprising a processor or media access controller 209 executing code referred to as a lower MAC 210, a baseband processor 211 coupled to the processor 209, a transceiver 212 coupled to the baseband processor 211, and an antenna 213 coupled to the transceiver 212. Note that the above-described components of the scheduled peer PSM device 200 are also collectively referred to as a station. In some embodiments, a station may comprise additional or different components. Further, in some embodiments, the lower MAC 210 can be incorporated into the baseband processor 211. The transceiver 212 comprises in one embodiment such well-known transceiver components including filters, amplifiers (e.g., power amplifiers, switches, etc.). The host processor 204 and processor (or media access controller) 209 may each be embodied as a digital signal processor (DSP), a microprocessor, a general purpose processor, or an application specific integrated circuit (ASIC), among others devices. One having ordinary skill in the art should appreciate that additional components not shown can be used (e.g., a host processor interface, various busses, etc.), yet which are omitted for brevity.

In one embodiment, preparation, transmission, and reception of frames, as well as the determination of signal strength, is under the control of the lower MAC 210 as executed by the processor 209. In some embodiments, control of the aforementioned functionality is solely by either the upper MAC 206 or the lower MAC 210, and in some embodiments, the execution of the MACs 206 and 210 may be implemented via a single processor or on two or more processors. In some embodiments, functionality of the upper and lower MACs 206 and 210 may be collectively performed in a single MAC.

In one embodiment, the upper MAC 206 and lower MAC 210 each comprise software (e.g., firmware) residing on the respective processors 204 and 209, respectively, and the software is executed by a suitable instruction execution system. In some embodiments, functionality of the upper MAC 206 and lower MAC 210 may comprise software stored in memory (e.g., memory 202) or other computer readable medium (e.g., optical, magnetic, semiconductor, etc.), and executed by the host processor 204 or other processor.

Figure 3:
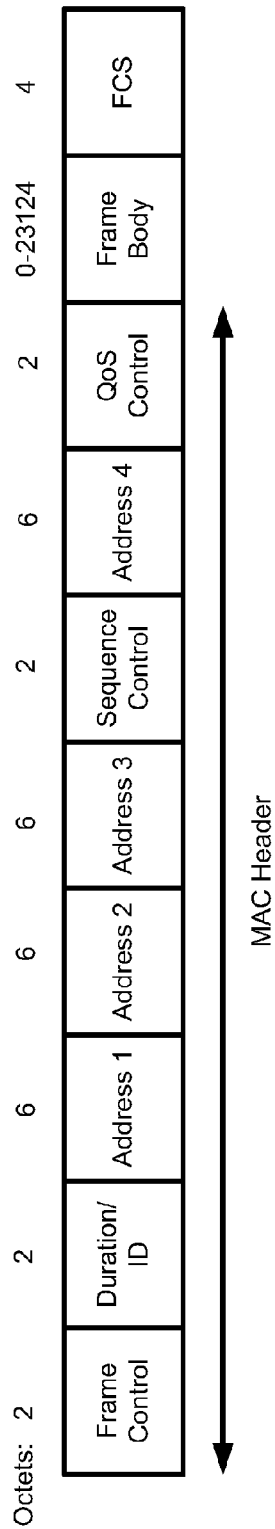
FIG. 3 is a schematic diagram of a general media access control (MAC) frame format defined in IEEE 802.11.

Wireless LANs are generally implemented according to the standard defined by the ISO/IEC 8802-11 international standard (IEEE 802.11) for wireless systems operating in the 2.4-2.5 GHz ISM (industrial, scientific and medical) band, which is also referred to as IEEE Std 802.11™-2007. FIG. 3 illustrates the general MAC frame format defined in IEEE 802.11. Each MAC frame includes a MAC header, a variable length frame body and a frame check sequence (FCS). As shown, the MAC header includes Frame Control, Duration/ID, Address 1, Address 2, Address 3, Sequence Control, Quality of Service (QoS) Control and Address 4 fields. A frame check sequence (FCS) is appended after the frame body. The address fields in MAC frame format are used to indicate the Basic Service Set identifier (BSSID), Source address (SA), Destination Address (DA), Transmitter Address (TA), and Receiver Address (RA), depending on the direction of the frame (station to station, station to AP, AP to station, or AP to AP, respectively). Thus, when receiving data frames transmitted in the wireless LANs, stations operating in a service set can detect the packets transmitted over a wireless media (WM) and determine the intended recipient in accordance with the destination information thereof. A station waiting for data frames needs to be powered in order to receive packets transmitted to the station.

However, since most stations in the wireless network are mobile devices which may be battery powered, power management becomes an important consideration in performance analysis. IEEE 802.11 provides a mechanism to support establishment and maintenance of the power management (PM) mode of a station, wherein a station may be in one of two different power states, awake and doze. The station in an awake state (also referred to as an awake mode) is fully powered, while the station in doze state is not able to transmit or receive and consumes very low power.

Unscheduled Asynchronous Power Save Delivery (U-APSD) is a mechanism for IEEE 802.11-based systems that was developed to help wireless devices conserve power. According to U-APSD, the station sends a trigger frame to the AP when the AP has indicated that it has buffered traffic for the station. The trigger frame is then typically acknowledged by the AP. The station remains awake after sending the trigger frame. At some time after receiving the trigger frame, the AP responds by sending buffered downlink traffic to the station. On the final downlink frame, the access point may set an End Of Service Period (EOSP) bit, which indicates to the station that the service period has ended and that the station can return to a doze state, where at least one of the active components utilized during normal operation is deactivated during a period of communicative inactivity. The rules governing the U-APSD service period are described in more detail in subclause 11.2.1.4 of IEEE Std 802.11™-2007 or in subclause 3.6 of WMM™ (including WMM™ Power Save) Specification version 1.1.

Scheduled peer PSM is a power save mode that can be used by a station and a peer station that support Tunneled Direct Link Setup (TDLS) (IEEE 802.11z). TDLS is characterized by the fact that the signaling frames are encapsulated in data frames, which allows them to be transmitted through an AP transparently. Therefore, a direct link can be setup using any AP. The AP does not need to be direct link aware, nor does it have to support any of the capabilities that will be used on the direct link. TLDS also includes an option to enter scheduled peer PSM while remaining on the direct link, so that the station can enter a doze state while the direct link remains logically in place.

Stations capable of supporting scheduled peer PSM may signal this capability by setting a Peer PSM capability bit to 1 in the Extended Capabilities Information Element in the body of a management frame. The Peer PSM capability bit set to 0 indicates that the station does not support this capability. Section 7.3.2.27 of IEEE document IEEE802.11-2007.pdf describes the Extended Capabilities Information Element in further detail.

FIGS. 5-19 are flow charts illustrating various methods of saving power for stations configured to communicate via a direct link. One or more of the methods include waking at a station and/or a peer station according to a periodic wakeup schedule for one or more scheduled wakeup intervals. The station and/or peer station transmit data frames to each other over a direct link during the scheduled wakeup intervals, and during the non-wakeup intervals, the station and/or peer station may enter a doze state. In some embodiments, the wakeup schedule is adjusted or terminated to increase the amount of time the station and/or the peer station may spend in a doze state to conserve power. In the doze state, it is not possible for the station to receive any frames on the wireless medium.

One or more of the methods is executable by the devices illustrated in the communication environment 100 depicted in FIG. 1. For example, the cell phone 102, the laptop computer 104, and the AP 120 of FIG. 1 may embody the station, the peer station, and the AP, respectively, described below. Further, in some embodiments, the scheduled peer PSM device 200 described above with respect to FIG. 2 may be configured as a station or a peer station. In other words, in some embodiments, the station or the peer station store modules, segments, or portions of code including one or more executable instructions for execution by a processor to implement specific logical functions or blocks of the embodiments of the methods described below.

Figure 5:
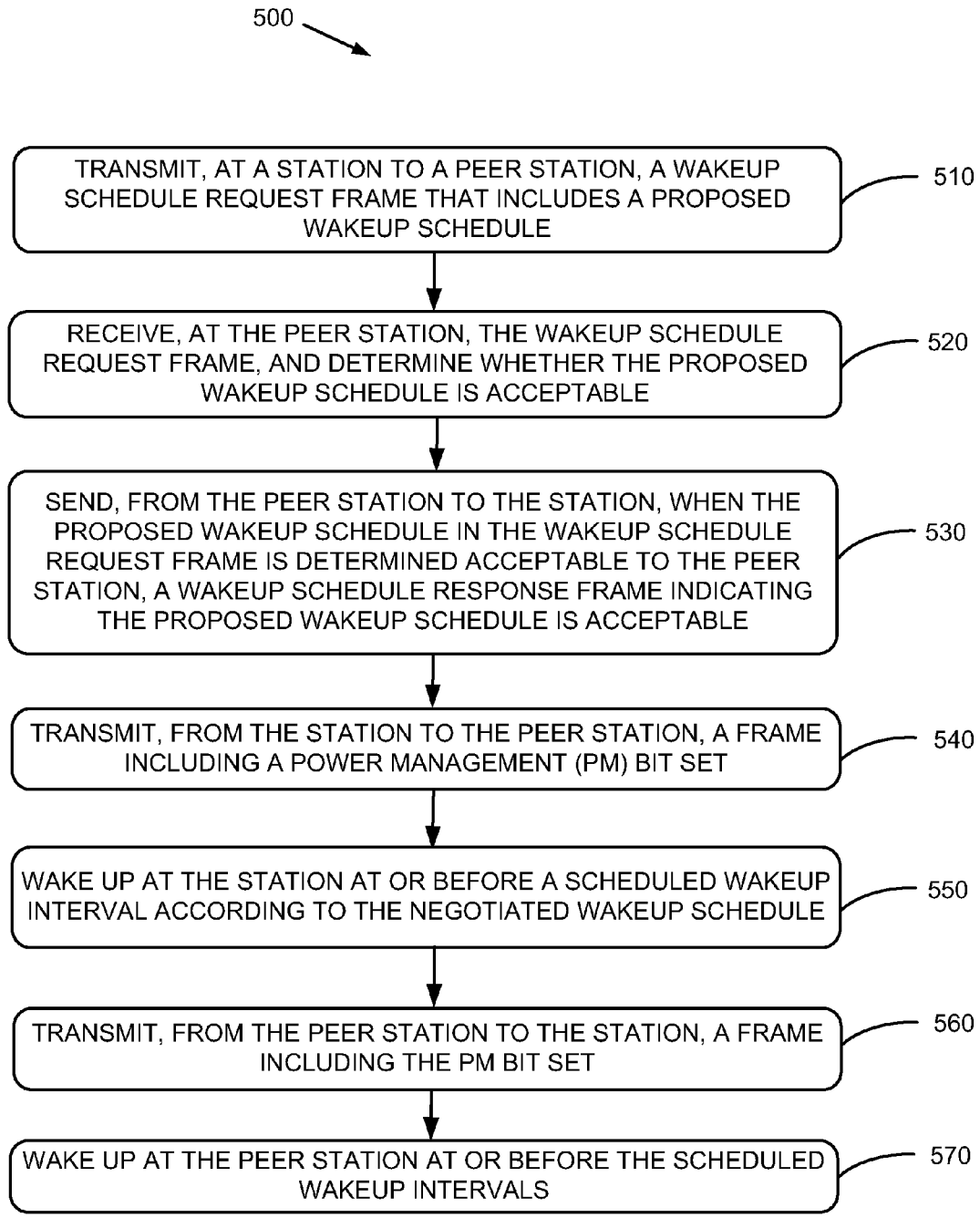
FIGS. 5-19 are flow charts that illustrate several embodiments of methods executed by the scheduled peer PSM system shown in FIGS. 1 and 2.

FIG. 5 is a flow chart that illustrates a first embodiment of a method of saving power for stations configured to communicate via a direct link. In FIG. 5, the method 500 includes blocks 510, 520, 530, 540, 550, 560, and 570. In block 510, a wakeup schedule request frame that includes a proposed wakeup schedule is transmitted from a station to a peer station. In some embodiments, the station is not in a power save mode with respect to the peer station and the peer station is not in a power save mode with respect to the station when the wakeup schedule request frame including the proposed wakeup schedule is transmitted from the station to the peer station.

An exemplary wakeup schedule request frame may include some or all of the information shown below in Table 1.

TABLE 1

Exemplary Wakeup Schedule Request Frame fields

| Order | Field | Notes |
|---|---|---|
| 1 | Link Identifier | The Link Identifier identifies the direct link |
| 2 | Wakeup Schedule | The wakeup schedule field defines a periodic wakeup schedule |

The link identifier field of the exemplary wakeup schedule request frame in Table 1 may identify a direct link through the station MAC address, the peer station MAC address, and the basic service set identifier (BSSID), which is the AP MAC address.

The wakeup schedule field of the exemplary wakeup schedule request frame defines a periodic wakeup schedule. Table 2 illustrates an exemplary embodiment of the subfields of the wakeup schedule field of a wakeup schedule request frame. The wakeup interval length subfield indicates the length of the wakeup interval. The wakeup interval offset subfield indicates the offset of the start of the wakeup interval relative to the TBTT. In some embodiments, a periodic wakeup schedule may be defined differently from the exemplary embodiment illustrated in Table 2.

TABLE 2

Exemplary Wakeup Schedule subfields

| Order | Information | Notes |
| --- | --- | --- |
| 1 | Wakeup Interval Length | 2 octet field that indicates the length of the wakeup interval in units of µs (unsigned integer). |
| 2 | Wakeup Interval Offset | 4 octet field that indicates the offset of the beginning of the wakeup interval relative to the TBTT, in units of µs (signed integer). |

The wakeup intervals are scheduled periods during which both the station and the peer station are to be in an awake state during which they can receive or transmit frames on the wireless medium. At other times (outside of the wakeup intervals), the station and the peer station may enter a doze state during which they can not receive frames on the wireless medium. The wakeup intervals are defined as a duration and a periodicity relative to a shared time reference, such as the timing synchronization function (TSF) or the target beacon transmission time (TBTT). The TSF is a timing reference that is shared amongst devices associated with the same AP within the same basic service set (BSS), and the TBTT is defined based on the TSF. The AP includes a TSF timestamp in every beacon frame it transmits, which can be used by stations in the BSS to synchronize their internal TSF timer. Since both the station and the peer station are associated with the same AP, which regularly transmits beacons to the stations, both stations have the same notion of the TSF and therefore the TBTT.

In some embodiments, the wakeup intervals are defined as a predefined number of idle slots instead of a fixed amount of time. The idle time slots are counted/determined according to the channel access rules that govern access to the channel. For example, in the absence of traffic exchanged between the station and the peer station, the station may enter a doze state after predefined number of idle slots have occurred. In some embodiments, the number of idle slots defining the wakeup interval may be negotiable between the station and the peer station instead of being predefined. In some embodiments, the number of idle slots defining the wakeup interval may be equal to a minimum contention window (CWmin). In some embodiments, the number of idle slots defining the wakeup interval may be related to an average contention window. Examples of channel access rules include the distributed coordination function (DCF) and enhanced distributed channel access (EDCA), both of which are defined in IEEE Std 802.11-2007. In some embodiments, the CWmin and the average contention window are defined according to the channel access rules.

In some embodiments, the peer station may be in a doze state without periodic wakeup when the wakeup schedule request frame is transmitted to the peer station from the station. Hence, at that point, it is unknown at the station if and when the peer station is ready to receive a frame on the wireless medium. The wakeup schedule request frame is transmitted to the peer station through the AP in block 510 in this case. In other embodiments, the peer station may not be in a power save mode, in which case the wakeup schedule request frame can be transmitted via the direct link in block 510.

In block 520, the wakeup schedule request frame is received at the peer station, and the peer station determines whether the proposed wakeup schedule is acceptable. The acceptability of the proposed wakeup schedule may be determined based on a variety of criteria. For example, the proposed wakeup schedule may be acceptable or not acceptable depending on the power level of the peer station. If the peer station is low on battery power, then it may not be appropriate for the peer station to begin a wakeup schedule that requires a frequent wakeup, and thus, under those conditions, the peer station may determine that the proposed wakeup schedule is not acceptable.

In block 530, when the proposed wakeup schedule in the wakeup schedule request frame is determined acceptable by the peer station, a wakeup schedule response frame is sent from the peer station to the station. The wakeup schedule response frame is sent via the direct link. The wakeup schedule response frame indicates that the proposed wakeup schedule is accepted or it acknowledges the proposed wake up schedule. An exemplary wakeup schedule response frame may include the information shown in Table 3.

TABLE 3

Exemplary Wakeup Schedule Response Frame Fields

| Order | Fields | Notes |
| --- | --- | --- |
| 1 | Link Identifier | The Link Identifier field identifies the direct link |
| 2 | Wakeup Schedule | The Wakeup Schedule field defines a periodic wakeup schedule |

The link identifier field may identify a direct link through the station MAC address, the peer station MAC address and the basic service set identifier (BSSID), which is the AP MAC address. The wakeup schedule field may be omitted from the wakeup schedule response frame when the wakeup schedule request frame included an acceptable wakeup schedule.

In some embodiments, the station enters an awake state immediately after sending the wakeup schedule request frame in block 510 and possibly before the station receives the wakeup schedule response frame sent from the peer station.

Figure 4:
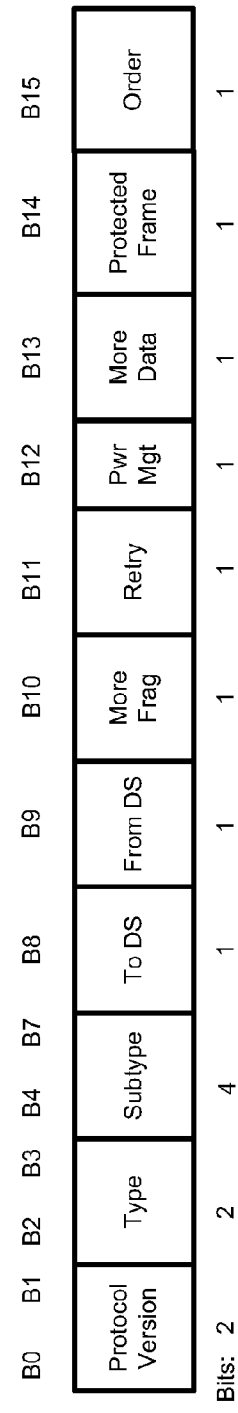
FIG. 4 is a schematic diagram of a frame control field of the general MAC frame format defined in IEEE 802.11 and depicted in FIG. 3.

In block 540, a frame including a power management (PM) bit set is transmitted from the station to the peer station. The PM field is 1 bit in length and indicates the PM mode of the station. The PM field is included in the frame control field of the MAC header, as illustrated in FIG. 4. The value of the PM bit indicates the mode of the station after the successful completion of the frame exchange sequence. A value of 1 indicates that the station is in a power save mode. A value of 0 indicates that the station is in an active (constantly awake) mode. The frame including the PM bit set in block 540 includes the PM bit set to 1, to indicate that the station is in a power save mode.

In block 550, the station wakes up at or before a scheduled wakeup interval according to the accepted wakeup schedule. In other words, the station enters an awake mode at or before a scheduled wakeup interval. The station may have formerly been in a doze state. The station is currently in a power save mode that includes periodically waking up for at least the negotiated wakeup intervals.

In block 560, a frame including a PM bit set is transmitted from the peer station to the station. The frame including the PM bit set includes the PM bit, which is illustrated in FIG. 4, set to 1 to indicate that the peer station is in a power save mode. The frame including the PM bit set to 1 may be transmitted during an awake window as agreed upon in block 530.

In block 570, the peer station wakes up at or before the scheduled wakeup intervals. In other words, the peer station enters an awake mode at or before the scheduled wakeup interval that was scheduled according to the negotiated wakeup schedule.

By waking up at or before a scheduled wakeup interval, the station and the peer station can transmit data to each other during the scheduled wakeup intervals and enter a doze state during the non-wakeup intervals. In this way, the station and the peer station are not always fully powered on to conserve power but yet the station and the peer station communicate often enough to keep up with the data traffic.

Figure 6:
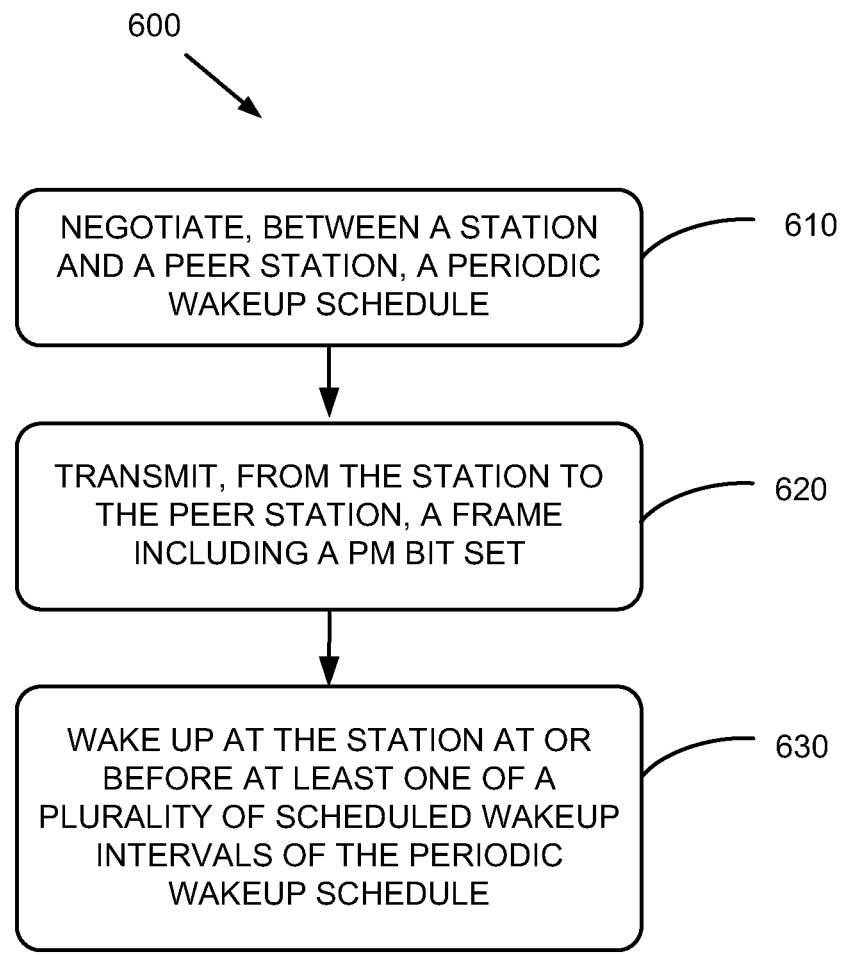

FIG. 6 is a flow chart that illustrates a second embodiment of a method of saving power for stations configured to communicate via a direct link. In FIG. 6, the method 600 includes blocks 610, 620, and 630. In block 610, a periodic wakeup schedule is negotiated by a station and a peer station. For example, the station may send a wakeup schedule request frame that defines a proposed periodic wakeup schedule. Specifically, the wakeup schedule request frame may contain a wakeup schedule field that defines a duration and a periodicity relative to a shared reference, such as the TBTT, as discussed above with respect to the first embodiment illustrated in FIG. 5. The information included in the wakeup schedule subfields may include a wakeup interval length and a wakeup interval offset, as illustrated in Table 2. In response to the received wakeup schedule request frame, the peer station may propose a different periodic wakeup schedule in a wakeup schedule response frame transmitted to the station. Alternatively, the peer station may accept or acknowledge the originally proposed periodic wakeup schedule in a wakeup schedule response frame transmitted to the station. The station may then respond by accepting, acknowledging the different periodic wakeup schedule or by proposing another periodic wakeup schedule. Wakeup schedule request/response frames may be exchanged in this manner between the station and the peer station until a proposed periodic wakeup schedule is accepted. Any other type of negotiation that results in a wakeup schedule that is agreed upon by the station and the peer station may be implemented as well. Proposing a wakeup schedule to the peer station by the station without allowing the option of rejecting or modifying the proposed wakeup schedule by the peer station is also considered a negotiation in this context.

In block 620, a frame including a PM bit set is transmitted from the station to the peer station. The frame including the PM bit set includes the PM bit, which is illustrated in FIG. 4, set to 1 to indicate that the station is in a power save mode. In some embodiments, the frame including the PM bit set may be referred to as a trigger frame, and the trigger frame may trigger a service period.

In block 630, the station wakes up at or before at least one of a plurality of scheduled wakeup intervals of the periodic wakeup schedule negotiated by the station and the peer station in block 610. In other words, the station enters an awake mode at or before each scheduled wakeup interval.

By waking up at or before a scheduled wakeup interval, the station and the peer station can transmit data to each other during the scheduled wakeup intervals and enter a doze state during the non-wakeup intervals. In this way, the station and the peer station are not always fully powered on to conserve power but yet the station and the peer station communicate often enough to keep up with the data traffic.

Figure 7:
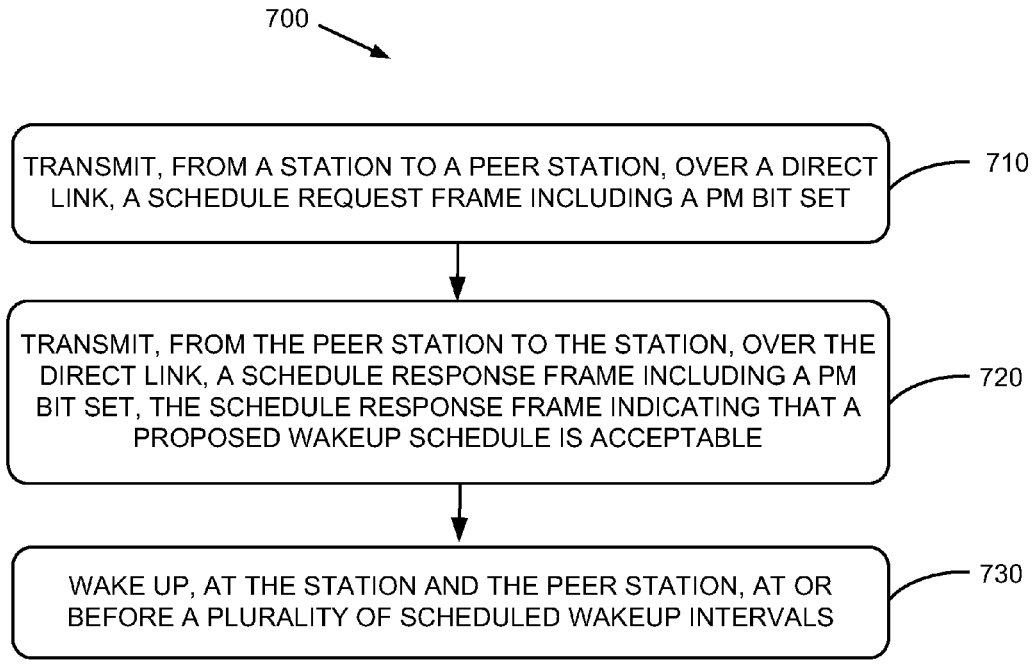

FIG. 7 is a flow chart that illustrates a third embodiment of a method of saving power for stations configured to communicate via a direct link. In FIG. 7, the method 700 includes blocks 710, 720, and 730. In block 710, a schedule request frame including a PM bit set is transmitted from a station to a peer station over a direct link. The schedule request frame defines a plurality of scheduled wakeup intervals. Specifically, the schedule request frame defines a duration and periodicity relative to a shared timing reference, such as the TBTT or TSF, as discussed above with respect to the first embodiment illustrated in FIG. 5. Information that may be included in the wakeup schedule subfields includes the wakeup interval length and the wakeup interval offset, as illustrated in Table 3. The PM bit, which is illustrated in FIG. 4, in the schedule request frame is set to 1 to indicate that the station is in a power save mode. After transmitting the schedule request frame including a PM bit set to 1, the station may postpone entering the power save mode until a schedule response frame is received from the peer station. In other embodiments, after transmitting the schedule request frame including a PM bit set, the station starts waking up according to the proposed wakeup schedule.

In block 720, a schedule response frame including a PM bit set is transmitted from the peer station to the station over the direct link, possibly after waiting for a proposed wakeup interval to occur. The schedule response frame includes the PM bit set to 1 to indicate that the station is in a power save mode. In some embodiments, the schedule response frame also indicates that the proposed wakeup schedule is accepted or acknowledges the proposed wake up schedule. The wakeup schedule field illustrated in Table 2 may be omitted from the wakeup schedule response frame to indicate the wakeup schedule request frame includes an acceptable wakeup schedule. The wakeup schedule field illustrated in Table 2 may also be included in the schedule response frame, to indicate an alternative wakeup schedule.

In block 730, the station and the peer station wake up at or before a plurality of scheduled wakeup intervals. For example, the station and the peer station both enter an awake mode at or before each scheduled wakeup interval of a plurality of scheduled wakeup intervals. The station and/or the peer station may have formerly been in a permanent doze state.

By waking up at or before a scheduled wakeup interval, the station and the peer station can transmit data to each other during the scheduled wakeup intervals and enter a doze state during the non-wakeup intervals. In this way, the station and the peer station are not always fully powered on to conserve power but yet the station and the peer station communicate often enough to keep up with the data traffic.

Figure 8:
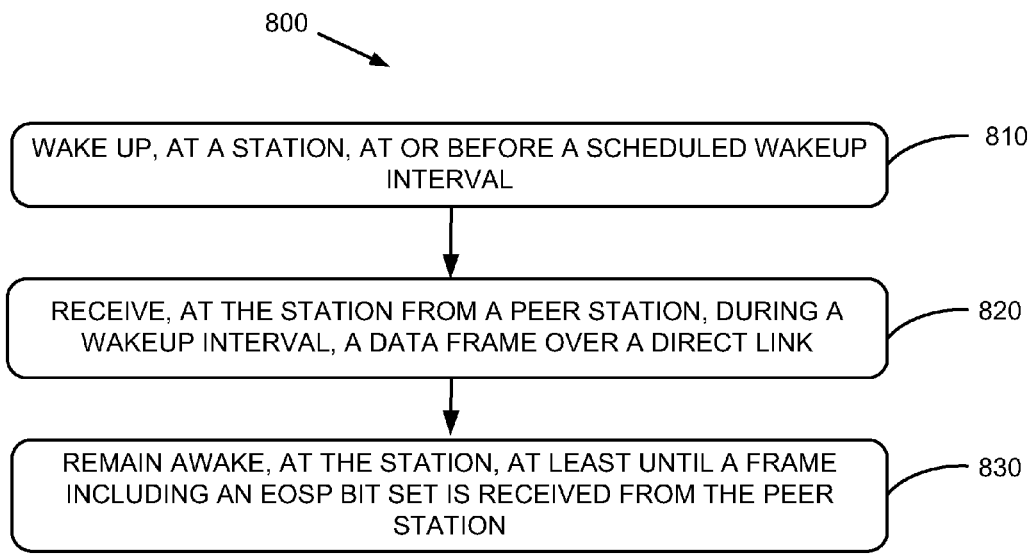

FIG. 8 is a flow chart that illustrates a fourth embodiment of a method of saving power for stations configured to communicate via a direct link. In FIG. 8, the method 800 includes blocks 810, 820, and 830. In block 810, a station wakes up at or before a scheduled wakeup interval. In other words, the station enters an awake mode at or before a scheduled wakeup interval.

In block 820, a data frame is received over a direct link at the station from a peer station during a scheduled wakeup interval. The data frame is sent during a service period that is started during a scheduled wakeup interval.

In block 830, the station remains awake at least until a frame including an End of Service Period (EOSP) bit set is received from the peer station. The frame including the EOSP bit set indicates that the service period is ending, and that the peer station will no longer be sending data frames for that service period to the station. In some embodiments, the station stays in an awake mode until a frame including an EOSP bit set is received, but enters a doze state before the scheduled wakeup interval has elapsed. In some embodiments, the frame including an EOSP bit set to 1 is the first frame received during the scheduled wakeup interval.

The Quality of Service (QoS) Control field, depicted in the MAC header illustrated in FIG. 3, includes an EOSP field that can be used to indicate to a receiver that no further data is buffered for that receiver and that a service period is terminated. The QoS Control field is described in Table 4 below. For QoS Data and QoS Null frames, the EOSP field is present as bit 4 of the QoS Control field.

TABLE 4

QoS Control field

| Applicable Frame (sub) Types | Bits 0-3 | Bit 4 | Bits 5-6 | Bit 7 | Bits 8-15 |
|---|---|---|---|---|---|
| QoS Data and QoS Null frames sent over the direct link | TID | EOSP | Ack Policy | Reserved | Reserved |

In the absence of traffic to be exchanged, the station remains awake for the duration of the negotiated wakeup interval length as illustrated in Table 2. When traffic is exchanged, the station remains awake until the end of the service period, which may be shorter or longer than the wakeup interval length.

Figure 9:
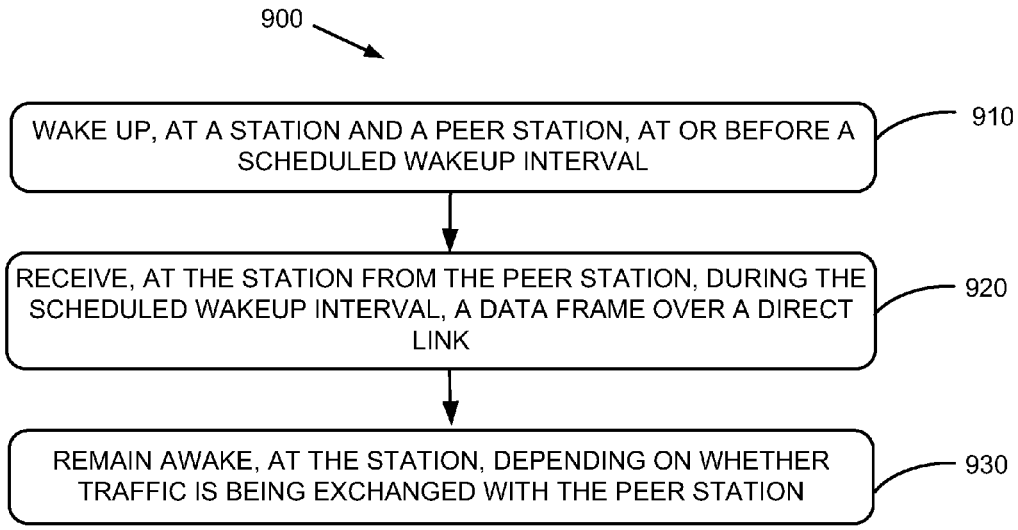

FIG. 9 is a flow chart that illustrates a fifth embodiment of a method of saving power for stations configured to communicate via a direct link. In FIG. 9, the method 900 includes blocks 910, 920, and 930. In block 910, a station wakes up at or before a scheduled wakeup interval. In other words, the station enters an awake mode at or before each scheduled wakeup interval.

In block 920, a data frame is received over a direct link at the station from a peer station during a scheduled wakeup interval. The data frame is sent during a service period that is started during a scheduled wakeup interval.

In block 930, the station remains awake depending on whether traffic is being exchanged with the peer station. For example, if no further traffic is being exchanged with the peer station because the service period was terminated by the transmission by the station of a frame with the EOSP bit set to 1, the station may enter a doze state after the scheduled wakeup interval has elapsed. If the service period will not be over before the scheduled wakeup interval has elapsed, the station remains awake until the end of the service period (e.g., until the traffic exchange is complete and the service period is terminated by a transmission by the station of a frame with the EOSP bit set to 1).

Figure 10:
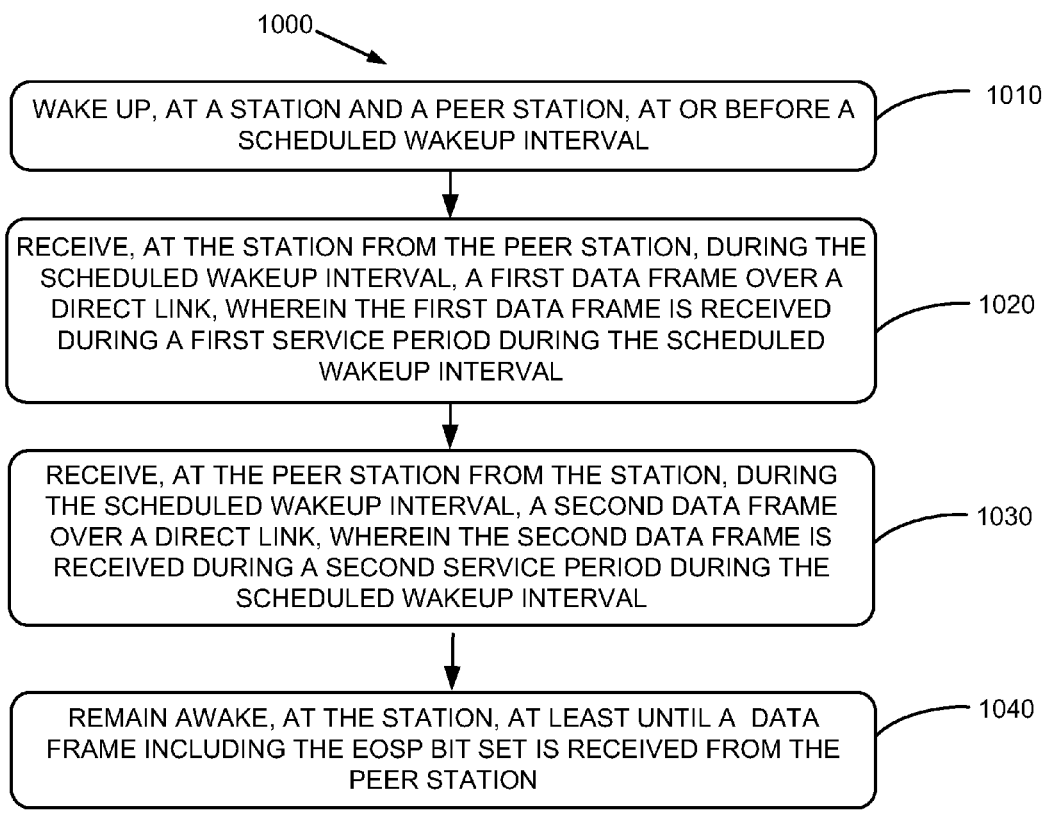

FIG. 10 is a flow chart that illustrates a sixth embodiment of a method of saving power for stations configured to communicate via a direct link. In FIG. 10, the method 1000 includes blocks 1010, 1020, 1030, and 1040. In block 1010, a station and a peer station wake up at or before a scheduled wakeup interval. For example, the station and the peer station both enter an awake mode at or before a scheduled wakeup interval.

In block 1020, a first data frame is received at the station from the peer station during the scheduled wakeup interval over a direct link. The first data frame is received during a first service period during the scheduled wakeup interval.

In block 1030, a second data frame is received at the peer station from the station during the scheduled wakeup interval over the direct link. The second data frame is received during a second service period during the scheduled wakeup interval.

In block 1040, the station remains awake at least until a data frame including the EOSP bit set is received from the peer station.

Figure 11:
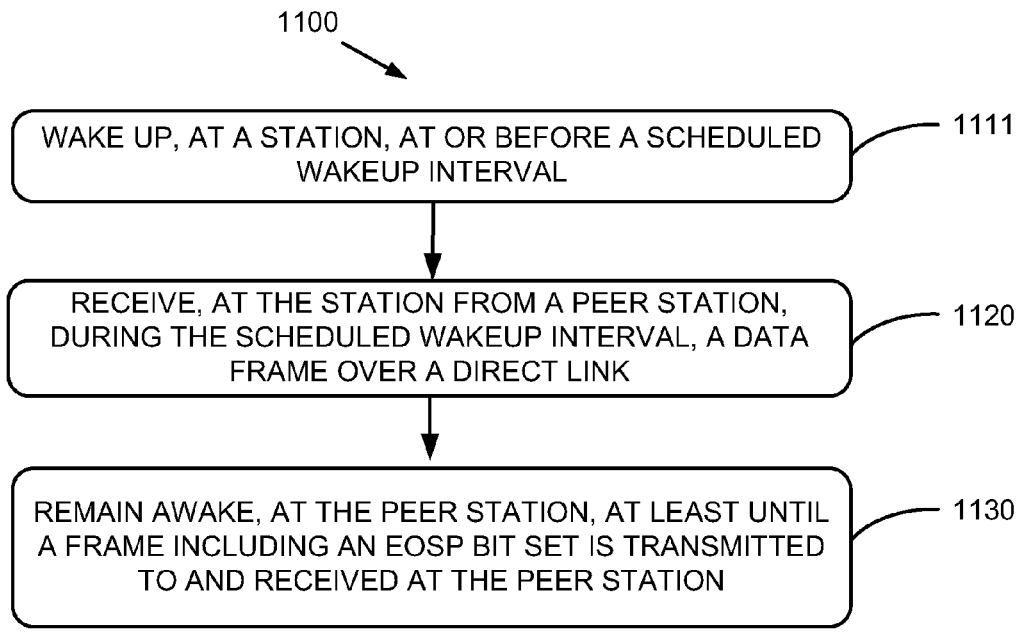

FIG. 11 is a flow chart that illustrates a seventh embodiment of a method of saving power for stations configured to communicate via a direct link. In FIG. 11, the method 1100 includes blocks 1111, 1120, and 1130. In block 1111, a station wakes up at or before a scheduled wakeup interval. In other words, the station enters an awake mode at or before each scheduled wakeup interval. The station may have formerly been in a doze state.

In block 1120, a data frame is received at the station from the peer station over a direct link during the scheduled wakeup interval. In other words, while the station is in an awake mode, the station receives a data frame from the peer station. Further, the data frame starts a service period or is received during a service period.

In block 1130, the peer station remains awake at least until a frame including an EOSP bit set is transmitted to and received at the peer station. The frame including the EOSP bit set indicates that the service period is ending, and that the peer station will no longer be sending data frames for that service period to the station. In some embodiments, the peer station stays in an awake mode until a frame including an EOSP bit set is received from the station, but enters a doze state before the scheduled wakeup interval has elapsed.

Figure 12:
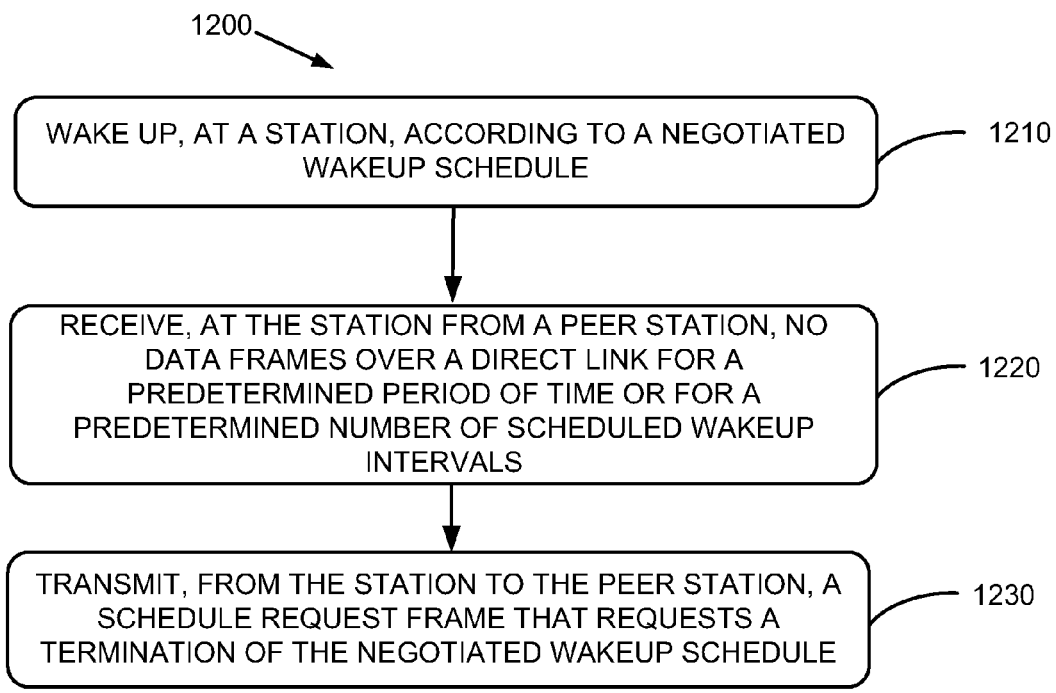

FIG. 12 is a flow chart that illustrates an eighth embodiment of a method of saving power for stations configured to communicate via a direct link. In FIG. 12, the method 1200 includes blocks 1210, 1220, and 1230. In block 1210, a station wakes up according to a negotiated wakeup schedule. In other words, the station enters an awake mode at or before a scheduled wakeup interval included in a negotiated wakeup schedule. The station may have formerly been in a doze state. The negotiated wakeup schedule may have been negotiated in a manner similar to the negotiations described regarding block 610 of the second embodiment, which is discussed above.

In block 1220, no data frames are received at the station from the peer station for a predetermined period of time, a predetermined number of idle slots, or a predetermined number of schedule wakeup intervals. In some embodiments, the no service period occurs for a predetermined time or for a predetermined number of scheduled wakeup intervals. In some embodiments, the predetermined period of time may be 200 ms. In some embodiments, the predetermined time period is negotiable between the station and the peer station. In some embodiments, the predetermined time period is determined at the station individually.

In block 1230, a schedule request frame that requests a termination of the negotiated wakeup schedule is transmitted from the station to the peer station. In some embodiments, the station requests a termination of the negotiated wakeup schedule by proposing a different wakeup schedule in the schedule request frame that includes no scheduled wakeup intervals. The transmitted schedule request frame is illustrated in Table 1, and the wakeup schedule subfields indicate that there are no scheduled wakeup intervals. Specifically, the wakeup interval length may be set to have a length of 0ps, and the wakeup interval offset may be set to be 0ps as well. Thus, according to the new different wakeup schedule, there are no scheduled wakeup intervals. A schedule request frame proposing a termination of the wakeup schedule may be referred to as a termination frame.

By terminating the negotiated wakeup schedule, the station and the peer station can both enter a doze state without periodically waking up for scheduled wakeup intervals. In this way, the time the station and the peer station spend in a doze state can be increased to conserve power.

Figure 13:
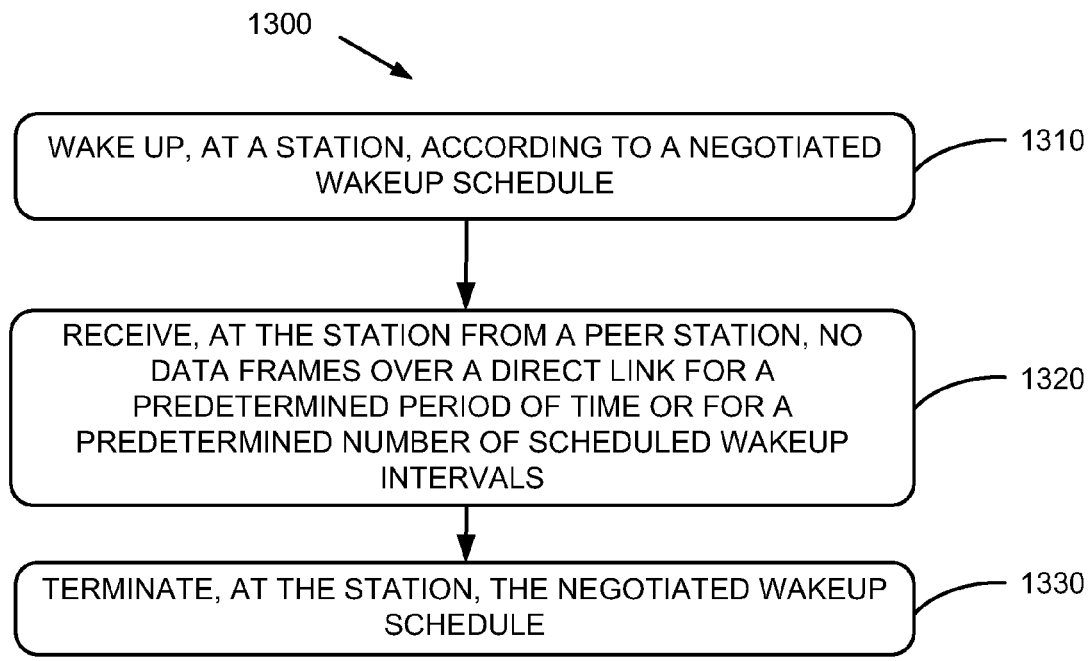

FIG. 13 is a flow chart that illustrates a ninth embodiment of a method of saving power for stations configured to communicate via a direct link. In FIG. 13, the method 1300 includes blocks 1310, 1320, and 1330. In block 1310, a station wakes up according to a negotiated wakeup schedule. In other words, the station enters an awake mode at or before a scheduled wakeup interval included in a negotiated wakeup schedule. The station may have formerly been in a doze state. The negotiated wakeup schedule may have been negotiated in a manner similar to the negotiations described regarding block 610 of the second embodiment, which is discussed above.

In block 1320, no data frames are received at the station over a direct link for a predetermined period of time or for a predetermined number of scheduled wakeup intervals. In some embodiments, the predetermined period of time is 200 ms. In other embodiments, the predetermined time period is negotiable between the station and the peer station.

In block 1330, the negotiated wakeup schedule is terminated at the station. In some embodiments, the station terminates the negotiated wakeup schedule by proposing a different wakeup schedule that includes no scheduled wakeup intervals. The station proposes the different wakeup schedule by transmitting a wakeup schedule request frame to the peer station. The transmitted wakeup schedule request frame is an indication frame as discussed above regarding the first embodiment, and the wakeup schedule subfields indicate that there are no scheduled wakeup intervals. Specifically, the wakeup interval length is set to have a length of 0ps, and the wakeup interval offset is set to be 0ps as well. This proposed wakeup schedule of no wakeups may be accepted by the peer station. Thus, since the negotiated wakeup schedule is terminated, there are no scheduled wakeup intervals, and hence, the station can enter a doze state to conserve power. A schedule request frame proposing a termination of the wakeup schedule may be referred to as a termination frame.

In other embodiments, the station will count a consecutive number of scheduled wakeup intervals that have occurred during which no data frame was transmitted (and therefore no service period began). When the counted number equals a predetermined number of scheduled wakeup intervals (which may be equal to 1), the station will terminate the negotiated wakeup schedule and may enter a more sustained doze state to conserve power without sending a termination frame.

Figure 14:
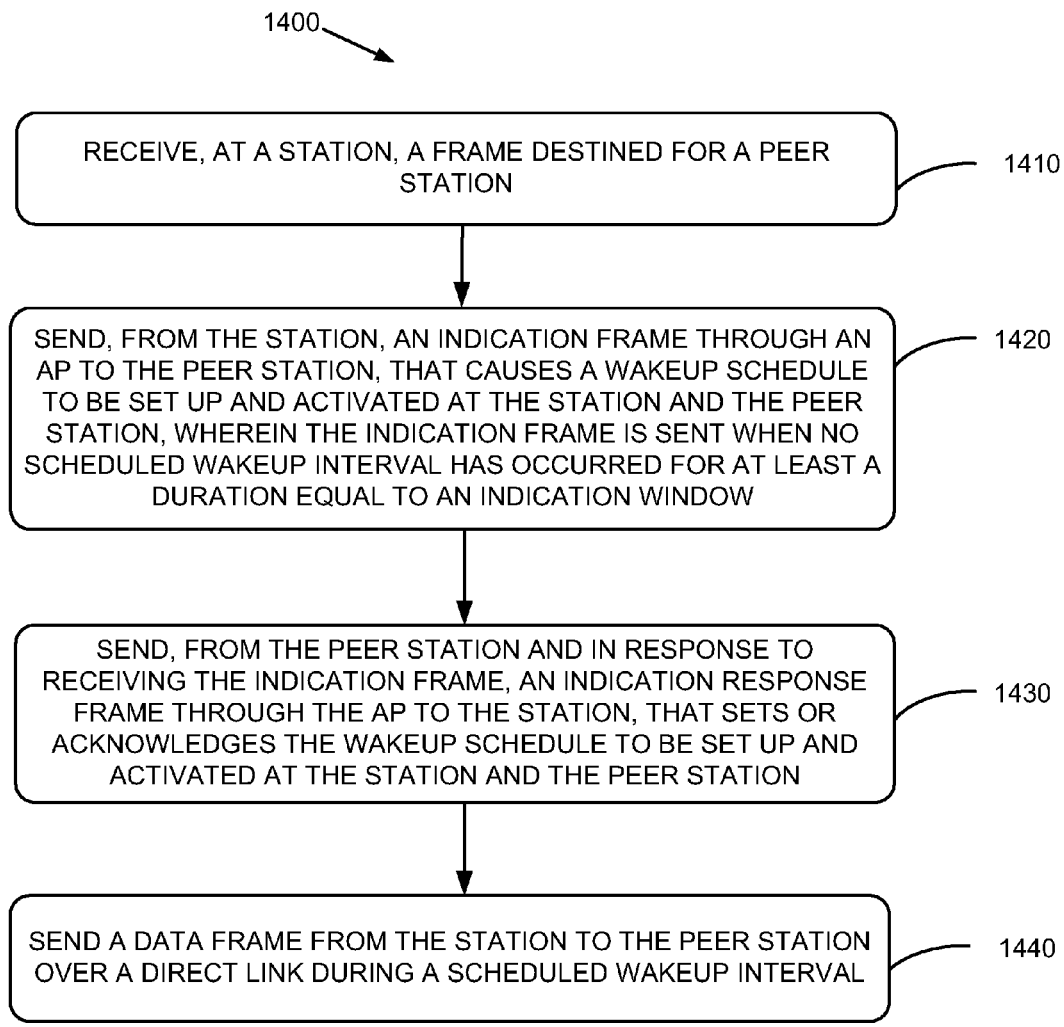

FIG. 14 is a flow chart that illustrates a tenth embodiment of a method of saving power for stations configured to communicate via a direct link. In FIG. 14, the method 1400 includes blocks 1410, 1420, 1430, and 1440. In block 1410, a frame destined for a peer station is received at a station. The frame may be an MDSU. The peer station may be in a power save state without periodic wakeup with respect to the station when the frame destined for the peer station is received by the station, which may imply that it is unknown at the station if and when the peer station is ready to receive a frame on the wireless medium.

In block 1420, an indication frame is sent from the station through an AP to the peer station, that causes a wakeup schedule to be set up and activated at the station and the peer station. An exemplary indication frame may include some or all of the information shown below in Table 5.

TABLE 5

Exemplary Indication Frame Fields

| Order | Field | Notes |
|---|---|---|
| 1 | Link Identifier | identifies the direct link |
| 2 | AC_VO state | indicates if AC_VO is empty (0) or not (1) |
| 3 | AC_VI state | indicates if AC_VI is empty (0) or not (0) |
| 4 | AC_BE state | indicates if AC_BE is empty (0) or not (1) |
| 5 | AC_BK state | indicates if AC_BK is empty (0) or not (1) |
| 6 | Wakeup Schedule | defines a periodic wakeup schedule |

The link identifier field of the exemplary indication frame in Table 5 may identify a direct link through the station MAC address, the peer station MAC address, and the basic service set identifier (BSSID), which is the AP MAC address.

The access category (AC) state fields in Table 5 may be optionally present in the schedule request frame to indicate whether the corresponding AC is empty (0) or non-empty (1). For example, as illustrated in Table 5, access category (AC) state fields AC_VO, AC_VI, AC_BE, AC_BK may be present. AC_VO is the access category for voice type traffic; AC_VI is the access category for video type traffic; AC_BE is the access category for best effort type traffic; and AC_BK is the access category for background type traffic.

The wakeup schedule field of the exemplary indication frame in Table 5 defines a periodic wakeup schedule. The subfields of the wakeup schedule field of the exemplary indication frame in Table 5 are the same as the subfields shown in Table 2 regarding the wakeup schedule field of the exemplary wakeup schedule request frame. In fact, in some embodiments, the indication frame may be a wakeup schedule request frame. The wakeup interval length subfield indicates the length of the wakeup interval. The wakeup interval offset subfield indicates the offset of the start of the wakeup interval relative to the TBTT or TSF. In some embodiments, the indication frame is sent when no wakeup schedule is currently active between the station and the peer station, and the peer station indicated to the station that the peer station is in a power save mode.

In some embodiments, the indication frame is sent when no scheduled wakeup interval has occurred for at least a duration equal to an indication window. The indication window prevents the transmission of that too many indication frames and suppresses the transmission of indication frames when a wakeup schedule is active.

The duration of the indication window is such that it is not too long to cause unwanted latency for buffered traffic and not too short to generate too many indication frames. In some embodiments, the duration of the indication window is negotiable between a station and a peer station. In some embodiments, the duration of the indication window is adjustable depending upon the inter-arrival time of MSDUs. For example, if the inter-arrival time of MSDUs in a stream exceeds the duration of the indication window, the duration of the indication window may be increased to avoid that an indication frame is transmitted for each MSDU. Likewise, if the inter-arrival time of MSDUs in a stream fall short of the duration of the indication window, the duration of the indication window may be decreased to reduce the latency that is experienced by the MSDUs before they get transmitted to the peer station. In some embodiments, the duration of the indication window is fixed or predetermined. For example, the duration of the indication window may be 200 ms.

In block 1430, an indication response frame is sent from the peer station through the AP to the station. The indication response frame is sent in response to receiving the indication frame at the peer station. The indication response frame sets up or acknowledges the wakeup schedule to be set up and activated at the station and the peer station. In some embodiments, the schedule response frame also indicates that the proposed wakeup schedule is accepted or acknowledges the proposed wake up schedule. In some embodiments, the indication frame does not contain a proposed wakeup schedule and the wakeup schedule is set by the indication response frame. The wakeup schedule field illustrated in Table 3 may be omitted from the schedule response frame to indicate the wakeup schedule request frame includes an acceptable wakeup schedule. An exemplary indication response frame includes the information shown in Table 6.

TABLE 6

Exemplary Indication Response Frame Fields

| Order | Fields | Notes |
|---|---|---|
| 1 | Link Identifier | The Link Identifier field identifies the direct link |
| 2 | Wakeup Schedule | The Wakeup Schedule field defines a periodic wakeup schedule |

The link identifier field may identify a direct link through the station MAC address, the peer station MAC address and the basic service set identifier (BSSID), which is the AP MAC address. The wakeup schedule field may be omitted from the wakeup schedule response frame when the wakeup schedule request frame included an acceptable wakeup schedule. In some embodiments, the indication response frame may also be a wakeup schedule response frame.

In block 1440, a data frame is sent from the station to the peer station over a direct link during a scheduled wakeup interval. In other words, the data frame is sent to the peer station when the peer station is in an awake mode, which is during a scheduled wakeup interval.

Figure 15:
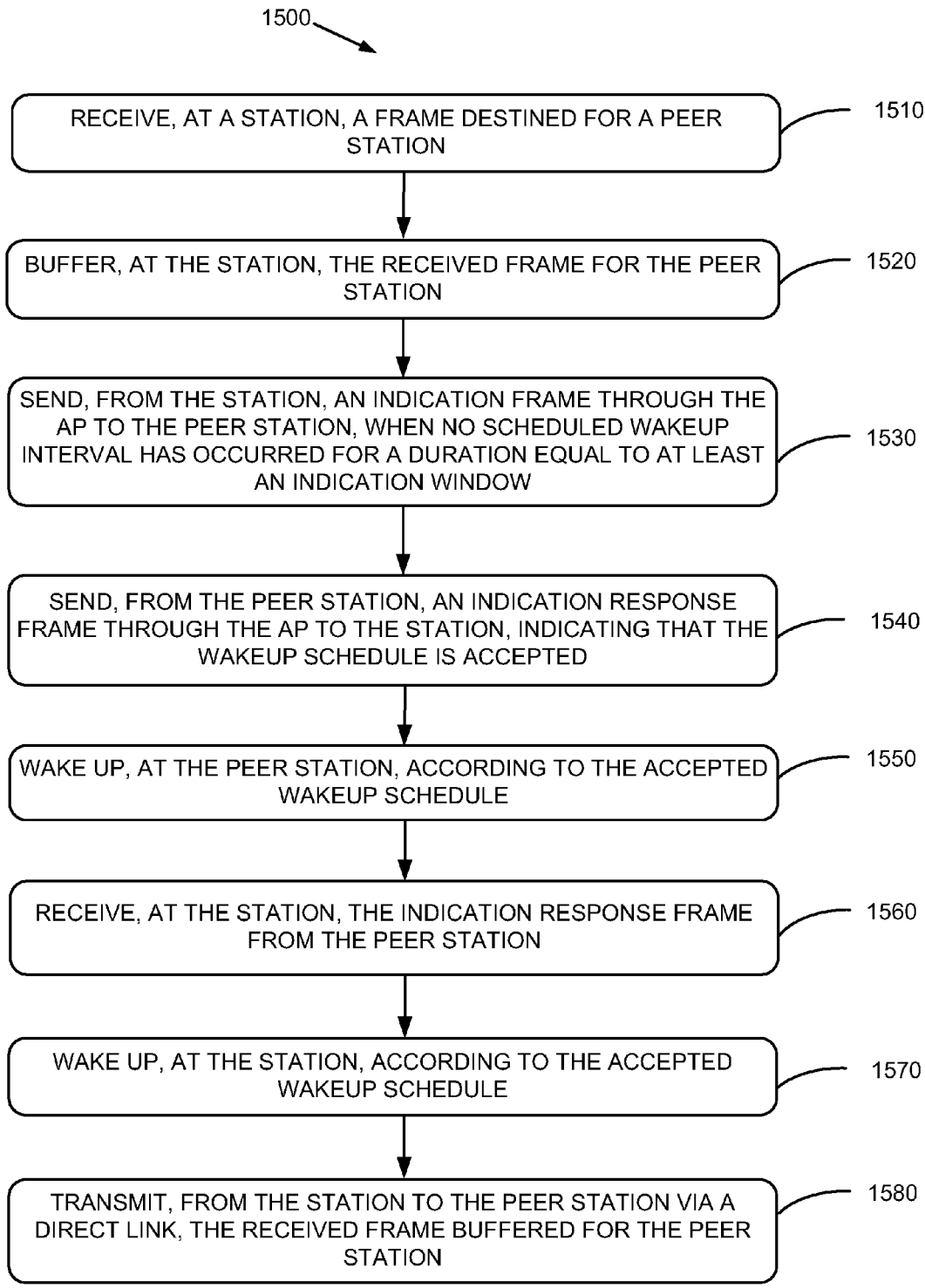

FIG. 15 is a flow chart that illustrates an eleventh embodiment of a method of saving power for stations configured to communicate via a direct link. In FIG. 15, the method 1500 includes blocks 1510, 1520, 1530, 1540, 1550, 1560, 1570 and 1580. In block 1510, a frame destined for a peer station is received at a station. The frame may be an MDSU. The peer station may be in a power save state without periodic wakeup when the frame destined for the peer station is received by the station, which may imply that it is unknown at the station if and when the peer station is ready to receive a frame on the wireless medium. In block 1520, the received frame for the peer station is buffered at the station. For example, the received frame may be placed in a queue, such as an access category (AC), to wait until the peer station is in an awake mode and able to receive the received frame. In block 1530, an indication frame is sent from the station through the AP to the peer station when no scheduled wakeup interval has occurred for a duration equal to at least an indication window. The indication frame may be transmitted when an indication window has expired without the occurrence of a scheduled wakeup interval. The indication window prevents the transmission of too many indication frames and suppresses the transmission of indication frames when a wakeup schedule is active. In some embodiments, an indication frame may be transmitted only when no indication frame has been transmitted for at least a duration equal to an indication window.

The duration of the indication window is such that it is not too long to cause unwanted latency for buffered traffic and not too short to generate too many indication frames. In some embodiments, the duration of the indication window is negotiable between a station and a peer station. In some embodiments, the duration of the indication window is adjustable depending upon the inter-arrival time of MSDUs. For example, if the inter-arrival time of MSDUs in a stream exceeds the duration of the indication window, the duration of the indication window may be increased. Likewise, if the inter-arrival time of MSDUs in a stream fall short of the duration of the indication window, the duration of the indication window may be decreased. In some embodiments, the duration of the indication window is fixed or predetermined. For example, the duration of the indication window may be 200 ms.

In block 1540, an indication response frame is sent from the peer station through the AP to the station. The indication response frame indicates that the wakeup schedule is accepted. The indication response frame may be formed as discussed above regarding block 530. In block 1550, the peer station wakes up according to the accepted wakeup schedule. In other words, the peer station enters an awake mode according to the scheduled wakeup intervals of the accepted wakeup schedule. In some embodiments, the station enters an awake state immediately after sending the indication frame in block 1530 and possibly before the station receives the indication response frame sent from the peer station. In other embodiments, the station enters an awake state according to the wakeup schedule included in the transmitted indication frame, immediately after sending the indication frame in block 1530.

In block 1560, the indication response frame is received at the station from the peer station. Hence, the station determines that the peer station is aware of the accepted wakeup schedule and that the peer station is waking up according to the accepted wakeup schedule. In some embodiments, when the station wakes up according to the wakeup schedule included in the transmitted indication frame immediately after transmitting the indication frame in block 1530, the peer station may transmit the indication response frame to the station via the direct link during a scheduled wakeup interval. In block 1570, the station wakes up according to the accepted wakeup schedule. In other words, the station enters an awake mode according to the scheduled wakeup intervals of the accepted wakeup schedule. In block 1580, the received frame buffered for the peer station in block 1520 is transmitted from the station to the peer station via a direct link. The received frame buffered for the peer station is transmitted from the station to the peer station during a service period.

In this way, the received frame buffered for the peer station was saved for sending to the peer station until a time in which the peer station would be in an awake mode and ready to receive the received frame. By buffering the received frame at the station and sending the received frame to the peer station during a scheduled wakeup interval, the time the peer station can spend in a doze state is increased, and thus, power is conserved.

Figure 16:
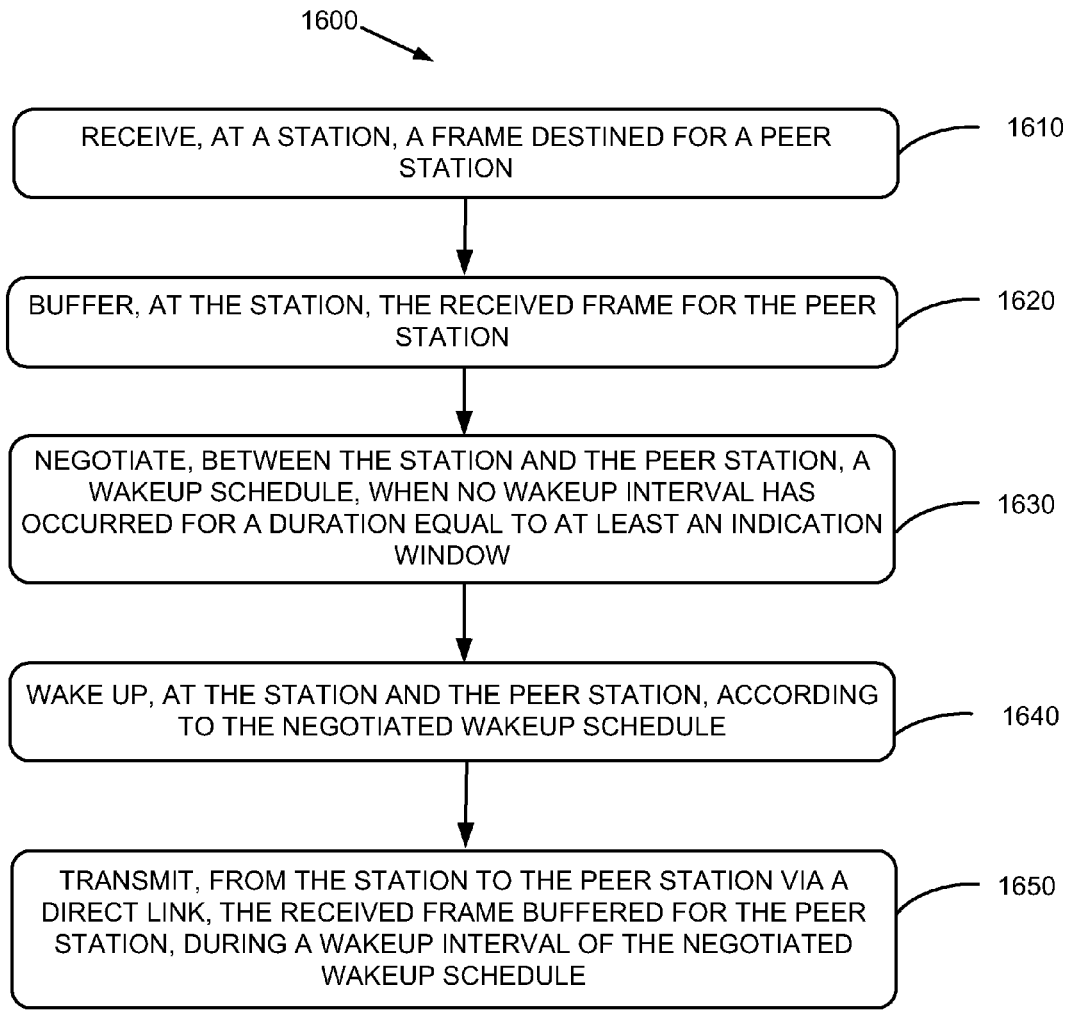

FIG. 16 is a flow chart that illustrates a twelfth embodiment of a method of saving power for stations configured to communicate via a direct link. In FIG. 16, the method 1600 includes blocks 1610, 1620, 1630, 1640, and 1650. In block 1610, a frame destined for a peer station is received at a station. The frame may be an MDSU. The peer station may be in a power save state without periodic wakeup when the frame destined for the peer station is received by the station, which may imply that it is unknown at the station if and when the peer station is ready to receive a frame on the wireless medium.

In block 1620, the received frame for the peer station is buffered at the station. For example, the received frame may be placed in a queue, such as an access category (AC), to wait until the peer station is in an awake mode and able to receive the received frame. In block 1630, a wakeup schedule is negotiated between the station and the peer station when no wakeup interval has occurred for a duration equal to at least an indication window. The wakeup schedule request frame may be transmitted when an indication window has expired. The indication window prevents the transmission of too many indication frames and suppresses the transmission of indication frames when a wakeup schedule is active. In another embodiment, a wakeup schedule is negotiated when no wakeup schedule is currently active between the station and the peer station.

The duration of the indication window is such that it is not too long to cause unwanted latency for buffered traffic and not too short to generate too many indication frames. In some embodiments, the duration of the indication window is adjustable depending upon the inter-arrival time of MSDUs. For example, if the inter-arrival time of MSDUs in a stream exceeds the duration of the indication window, the duration of the indication window may be increased. Likewise, if the inter-arrival time of MSDUs in a stream falls short of the duration of the indication window, the duration of the indication window may be decreased. In some embodiments, the duration of the indication window is fixed or predetermined as a result of the negotiated wakeup schedule. For example, the negotiated duration of the indication window may be 200 ms.

In block 1640, the station and the peer station wake up according to the negotiated wake up schedule. In other words, the station and the peer station enter an awake mode at scheduled wakeup intervals according to the negotiated wakeup schedule. In block 1650, the received frame buffered for the peer station is transmitted from the station to the peer station via direct link during a wakeup interval of the negotiated wakeup schedule.

In this way, the received frame buffered for the peer station was saved for sending to the peer station until a time in which the peer station would be in an awake mode and ready to receive the received frame. By buffering the received frame at the station and sending the received frame to the peer station during a scheduled wakeup interval, the time the peer station can spend in a doze state is increased, and thus, power is conserved.

Figure 17:
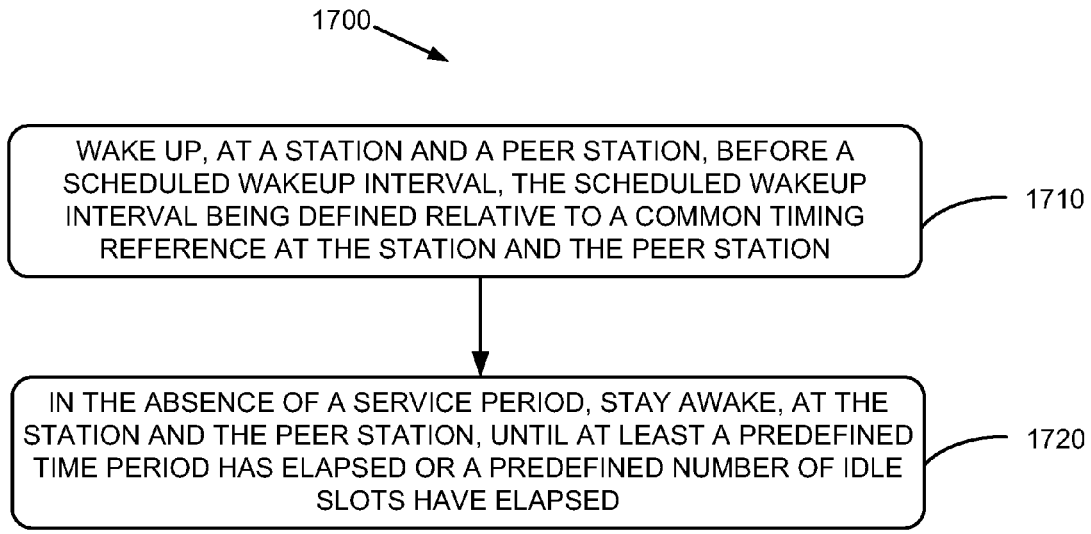

FIG. 17 is a flow chart that illustrates a thirteenth embodiment of a method of saving power for stations configured to communicate via a direct link. In FIG. 17, the method 1700 includes blocks 1710, and 1720. In block 1710, a station and a peer station wake up before a scheduled wakeup interval. The scheduled wakeup interval is defined relative to a common timing reference at the station and the peer station. In some embodiments, the common timing reference is a target beacon transmission time (TBTT) associated with a beacon. The beacon is delivered by an access point (AP), which is associated with the station and the peer station. The scheduled wakeup interval is one of a plurality of scheduled wakeup intervals included in a wakeup schedule, which may be periodic.

In block 1720, in the absence of a service period, the station and the peer station stay awake until at least a predefined time period has elapsed or a predefined number of idle slots have elapsed.

In some embodiments, the station and the peer station stay awake until a service period has ended. In some embodiments, the station and the peer station enter a doze state when at least a predefined time period has elapsed during which no service period has occurred between the station and the peer station.

In some embodiments, the station and the peer station enter a doze state when at least a predefined number of idle slots have elapsed and no service period has occurred between the station and the peer station during the duration of the predefined number of idle slots that elapsed. In some embodiments, the idle time slots are determined according to a distributed channel access protocol.

In some embodiments, the method 1700 further includes the waking up being terminated when a predefined number of scheduled wakeup intervals have elapsed during which no service period has occurred. Further, in some embodiments, the waking up is terminated by the transmission of a termination frame by the station or the peer station.

Figure 18:
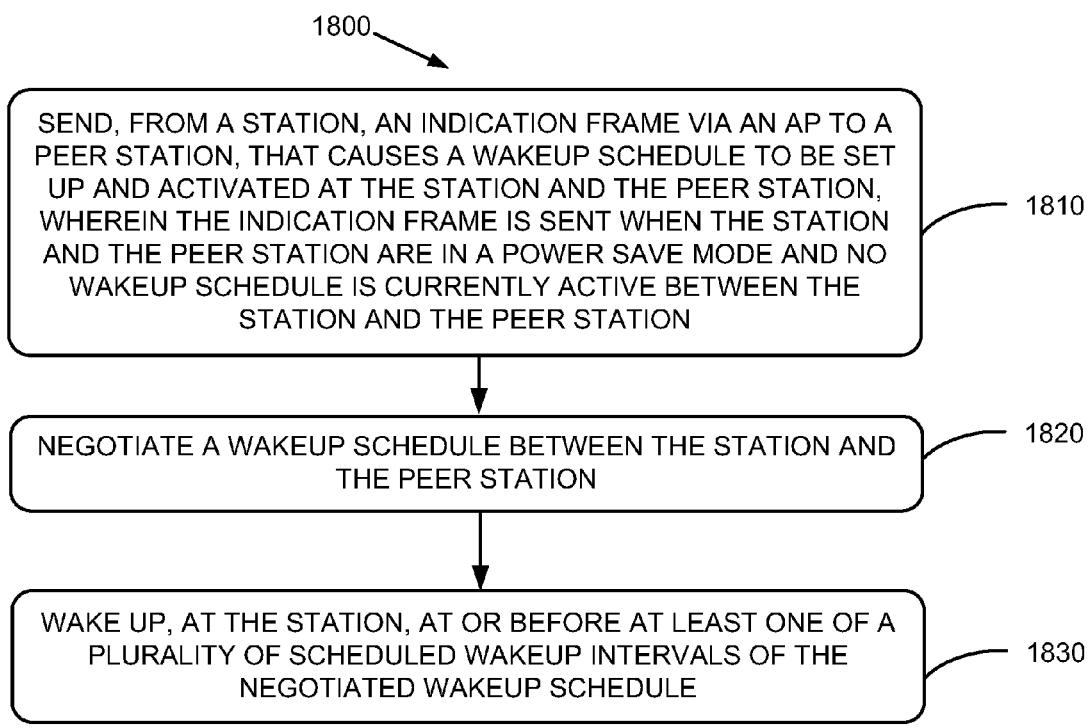

FIG. 18 is a flow chart that illustrates a fourteenth embodiment of a method of saving power for stations configured to communicate via a direct link. In FIG. 18, the method 1800 includes blocks 1810, 1820 and 1830. In block 1810, an indication frame is sent from a station via an AP to a peer station that causes a wakeup schedule to be set up and activated at the station and the peer station. The indication frame is sent when the station and the peer station are in a power save mode and no wakeup schedule is currently active between the station and the peer station.

In block 1820, a wakeup schedule is negotiated between the station and the peer station. In other words, the station and the peer station negotiate a wakeup schedule. In block 1830, the station wakes up at or before at least one of a plurality of scheduled wakeup intervals of the negotiated wakeup schedule.

Figure 19:
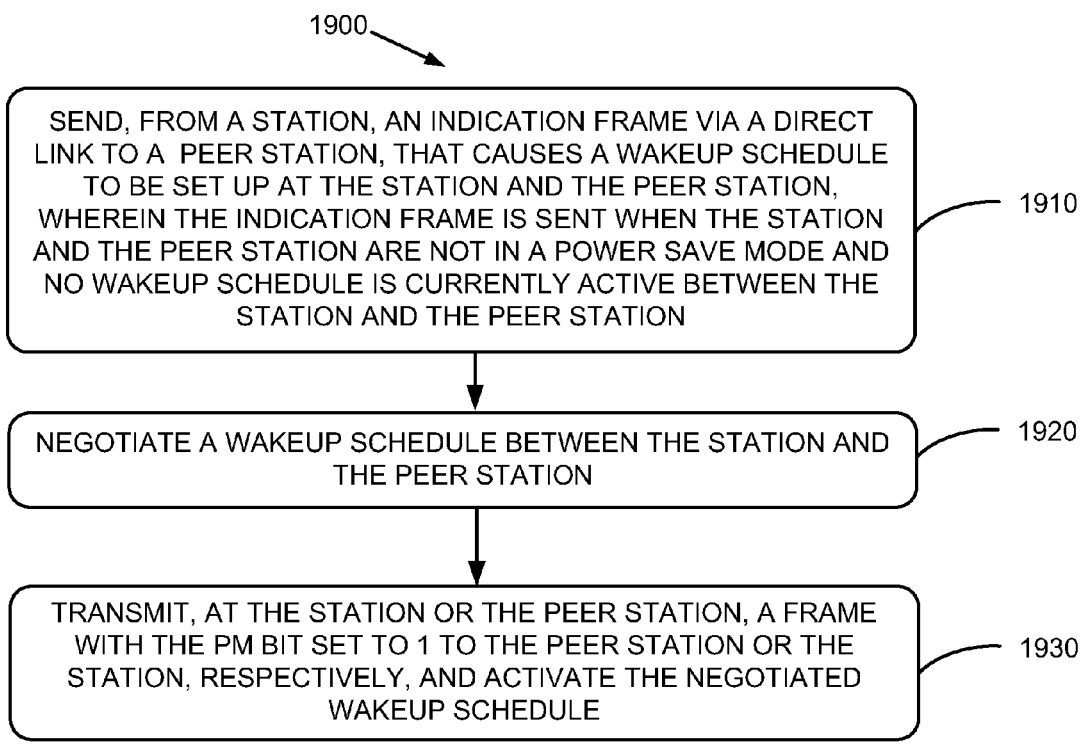

FIG. 19 is a flow chart that illustrates a fifteenth embodiment of a method of saving power for stations configured to communicate via a direct link. In FIG. 19, the method 1900 includes blocks 1910, 1920, and 1930. In block 1910, an indication frame is sent from the station via a direct link to a peer station that causes a wakeup schedule to be set up at the station and the peer station. The indication frame is sent when the station and the peer station are not in a power save mode and no wakeup schedule is currently active between the station and the peer station.

In block 1920, a wakeup schedule is negotiated between the station and the peer station. In other words, the station and the peer station negotiate a wakeup schedule. In block 1930, a frame with a PM bit set to 1 is transmitted from the peer station or the station, respectively, and the station or the peer station activates the negotiated wakeup schedule.

In the various embodiments discussed above with respect to FIGS. 5-19, traffic for an AC may be routed over the direct link while traffic for another AC may be routed through the AP. If an AC carries traffic that has high duty cycle relative to the traffic routed through another AC, it may be useful to route the traffic having the higher duty cycle over the direct link while the traffic having the lower duty cycle is routed through the AP. Video (VI) and voice (VO) traffic may have a high duty cycle relative to background (BK) and best effort (BE), and traffic for AC_VI and AC_VO is routed through the direct link while traffic for AC_BK and AC_BE is routed through the AP.

The various embodiments discussed above with respect to FIGS. 5-19 may be used when the duty cycle is still low enough for idle periods to be used to save power. When the duty cycle exceeds a certain threshold (for instance when the duty cycle is higher than approximately 70%), the stations may decide to always be awake. A high duty cycle may also cause the service period to extend into the next scheduled wakeup, in which case there is no time to enter a doze state while a periodic wakeup schedule is still active and the stations are still in a power save mode.

In the various embodiments discussed above with respect to FIGS. 5-19, one or more additional direct links may be present. For example, a station may communicate over a first direct link to a first peer station, and the station may also communicate over a second direct link to a second peer station. Further, the station may communicate over the first direct link to the first peer station according to a first wakeup schedule, and the station may communicate over the second direct link to the second peer station according to a second wakeup schedule. In order to further conserve power at the station, the first wakeup schedule and the second wakeup schedule may overlap or be the same. The station may negotiate the first wakeup schedule with the first peer station and the second wakeup schedule with the second peer station to produce a first wakeup schedule and a second wakeup schedule that overlap or are the same.

In the various embodiments discussed above with respect to FIGS. 5-19, where applicable, the wakeup schedule may be negotiated as part of the direct link setup handshake. In some embodiments, the station and/or the peer station may indicate to the other station whether the station and/or the peer station will be in a power save mode when the direct link setup handshake completes. This indication is similar to the exchange of frames with the PM bit set to 1, except that the information is piggybacked on the setup handshake. A wakeup schedule may be negotiated as part of the direct link setup handshake, or the wakeup schedule may be negotiated when a traffic stream will be transmitted over the direct link in the near future, initiated for instance by a higher layer protocol or application.

Any process descriptions or blocks in flow diagrams shown in FIGS. 5-19 should be understood as representing modules, segments, or portions of code which include one or more executable instructions for implementing specific logical functions or steps in the process, and alternate implementations are included within the scope of the embodiments described herein in which functions may be executed out of order from that shown or discussed, including substantially concurrently or in reverse order, depending on the functionality involved, as would be understood by those reasonably skilled in the art. Additionally, the methods illustrated in the flow charts of FIGS. 5-19 are not limited to the system embodiments shown in FIGS. 1 and 2, but may be extended to other architectures and systems as should be appreciated by one having ordinary skill in the art in the context of this disclosure.

It should be emphasized that the above-described embodiments are merely possible examples of implementations, merely set forth for a clear understanding of the principles of the disclosure. Many variations and modifications may be made to the above-described embodiment(s) without departing substantially from the scope of the disclosure. All such modifications and variations are intended to be included herein within the scope of this disclosure.

At least the following is claimed:

1. A method comprising:
  determining a wakeup schedule; and
  communicating the wakeup schedule between a first station and a second station, the wakeup schedule scheduling a plurality of fixed length durations, each duration comprising a dynamic wakeup interval, wherein in the absence of a service period, the dynamic wakeup interval comprises a fixed number of idle slots and the total length of the dynamic wakeup interval depends.

2. The method of claim 1, wherein the number of idle slots elapse according to a distributed channel access method.

3. The method of claim 2, wherein the distributed channel access method is the enhanced distributed channel access (EDCA) method.

4. The method of claim 1, wherein a first wakeup interval ends after a fixed time period and before the number of idle slots elapse.

5. The method of claim 1, wherein the wakeup schedule is defined relative to a shared time reference.

6. The method of claim 5, wherein the shared time reference corresponds to one of a timing synchronization function (TSF) or a target beacon transmission time (TBTT).

* * * * *